United States Patent [19]

Parker

[11] 4,029,479

[45] June 14, 1977

[54] PLATED FOIL FOR LIQUID INTERFACE BONDING OF TITANIUM

[75] Inventor: Elmo G. Parker, La Mesa, Calif.

[73] Assignee: Rohr Industries, Inc., Chula Vista, Calif.

[22] Filed: June 1, 1976

[21] Appl. No.: 691,663

Related U.S. Application Data

[60] Division of Ser. No. 327,341, Jan. 29, 1973, Pat. No. 3,981,429, which is a continuation of Ser. No. 81,262, Oct. 16, 1970, abandoned.

[52] U.S. Cl. .............................. 428/660; 428/673; 428/674
[51] Int. Cl.² ...................................... B32B 15/20
[58] Field of Search .......... 228/194, 195, 238, 263, 228/252, 254; 29/198, 498, 501, 194, 199

[56] References Cited

UNITED STATES PATENTS

| | | | |
|---|---|---|---|
| 3,417,461 | 12/1968 | Wells et al. | 29/198 |
| 3,455,663 | 7/1969 | Zdanuk | 29/198 |
| 3,466,737 | 9/1969 | Hanink | 29/492 |
| 3,854,194 | 12/1974 | Woodward | 29/198 |

*Primary Examiner*—Arthur J. Steiner
*Attorney, Agent, or Firm*—Patrick J. Schlesinger; Frank D. Gilliam

[57] ABSTRACT

For the diffusion bonding of members of titanium and some titanium alloys, layers of Cu, Ag and Ni are deposited by plating on both sides of a sheet of etched, chemically clean, titanium or titanium alloy foil of a thickness preferably less than 0.001 inch. The plated foil is interposed between faying surfaces of the members to be bonded together, and the members, with the interposed foil, are sealed under pressure, in an inert atmosphere and under partial vacuum or hard vacuum of, for example, $10^{-4}$Torr. The parts thus prepared are heated to brazing temperature to render liquidus plating material and thereby establish a diffusion bridge between each plated face of the foil and the adjacent faying surface of each of the members. Heating is continued to induce atomic diffusion in the zone thus established between the titanium of the foil and the members, and between the members themselves, until the diffusion zone becomes principally titanium with traces of plating materials diffused throughout.

2 Claims, 4 Drawing Figures

PLATED FOIL FOR LIQUID INTERFACE BONDING OF TITANIUM

This is a division of application Ser. No. 327,341, filed Jan. 29, 1973, now U.S. Pat. No. 3,981,429; which was a continuation of Ser. No. 81,262, filed Oct. 16, 1970, now abandoned.

BACKGROUND OF THE INVENTION

This invention relates to the diffusion bonding of titanium and some titanium alloys. It is known that when two members of titanium are placed with clean, faying surfaces thereof in intimate, overall pressurized contact, in an inert atmosphere, under partial vacuum, and heated to a predetermined temperature well below the melting point of titanium, atomic diffusion occurs across the joint between the members so that the two members become integrally bonded together. However, any lack of full and complete contact and complete chemical cleanness at the faying surfaces inhibits the diffusion bonding of the members. Previously filed U.S. Pat. applications Ser. No. 765,156 filed Oct. 4, 1968, and Ser. No. 888,501, filed Dec. 29, 1969, both by James R. Woodward, and both assigned to the assignee of the present invention, pertain to the plating of one or both of the faying surfaces of two titanium members to be joined by diffusion bonding, so that when the members are placed with their plated surfaces in contact with each other, in an inert atmosphere, under partial vacuum, and heated, plating metal will melt and thereby form a liquid bridge between the faying surfaces across which the atomic diffusion of titanium of the members is greatly accelerated. These prior developments, known as Liquid Interface Diffusion or L.I.D., have proven highly effective in use, but with some titanium parts to be thus joined, the plating of the faying surfaces has proven cumbersome, and not always adapted to large production. Furthermore, the plating of each part is an added, and frequently costly operation.

SUMMARY OF THE INVENTION

An extremely thin sheet of foil of commercially pure titanium, or a selected alloy thereof, with both sides thereof etched and chemically clean, and each side plated with one or more layers of compatible brazing material, is interposed between fitted, chemically clean, faying surfaces of two members of titanium or selected titanium alloys to be joined by liquid interface diffusion bonding. The members are subjected to required pressure in an inert atmosphere under partial or hard vacuum at a temperature to initially render liquidus part or all of the plating metal or metals, and are thereafter sustained at a required temperature to promote atomic diffusion of the plating material and the titanium of the foil and of both members in the zone of the interface, thereby developing a diffusion bond between the members in such zone consisting principally of titanium, with small amounts of the plating metal or metals diffused therein.

BRIEF DESCRIPTION OF THE DRAWINGS

The foregoing objectives and advantages of the invention will be apparent from the following description and the accompanying drawings, wherein.

DETAILED DESCRIPTION

Figure 1:
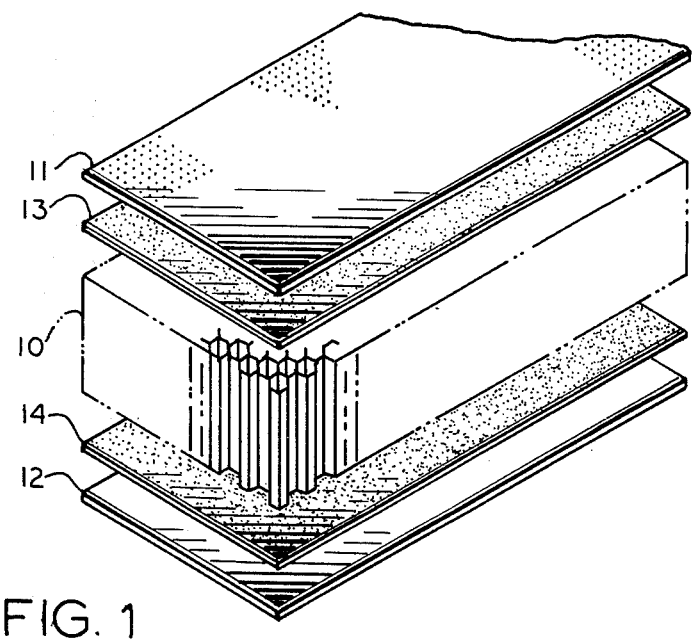
FIG. 1 is an exploded, fragmentary, perspective view of a small piece of the honeycomb core of a honeycomb sandwich panel with a sheet of plated titanium foil interposed between each end of the core and a facing sheet to be joined thereto.

Referring to the drawings in detail, FIG. 1 shows a fragment of the honeycomb core 10 for a honeycomb sandwich panel of a type commonly used in aircraft and other structures where a structural panel of high strength, stiffness, and light weight is required. The core 10 and its usual two facing sheets 11 and 12 are of titanium or a selected titanium alloy.

Sheets 13 and 14 of plated foil of titanium or selected titanium alloy are interposed, respectively, between the facing sheets 11 and 12 and the core 10. In preparing the foil sheets 13 and 14, both sides of each sheet are surface-etched by a suitable etchant, for example, one containing sulfuric and chromotropic acids, to a uniform rough texture similar to that obtained by dust blasting, with a resultant foil thickness of the order of 0.001 inch. This thickness is not critical, but preferably does not exceed 0.0006 inch. The foil is then subjected to a thorough cleaning process, for example as set forth in U.S. Pat. No. 3,379,645 to Kendall, which patent is assigned to the assignee of the present invention. It is recommended that the ultimate possible degree of chemical cleanliness of the foil surface be attained, since any foreign matter in the resultant L.I.D. joint would be deleterious.

The etched, cleaned foil is then plated, preferably on both sides, with a layer or successive layers of suitable, compatible brazing metal or metals which will provide the required diffusion bridge, and will diffuse in the resultant bonded joint. At this point in the development of the invention a plating procedure of optimum effectiveness and desirability probably has not yet been found, since a great many of the elements of the periodic table react in compound form with titanium, and research is still in progress to discover better plating materials and procedures for use in the practice of the invention. However, the presently preferred plating procedure is Cu-Ag-Ni in that order on each side of the etched foil with an overall coating of 6 g/ft$^2$ thickness on each side. The presently preferred percentages of the plating metals are Cu 38%, Ni 38% and Ag 24%.

In bonding the parts shown in FIG. 1 in accordance with the invention, the facing sheets 11 and 12 and the honeycomb core 10 are cleaned to a high degree of chemical cleanliness, for example, by the same process as that used to clean the foil, and the plated foil sheets 13 and 14 are interposed, respectively, between the facing sheets 11 and 12 and the core 10. The assembly is then subjected to required pressure toward the foil, in the nature of a conventional braze package and in accordance with well known L.I.D. procedure, in a suitable inert atmosphere, under partial vacuum, or under hard vacuum of the order of $10^{-4}$ Torr. The parts are then heated to a temperature which renders liquidus plating metal or metals on each plated side of each interposed foil sheet, thereby establishing a liquid bridge between such side of the foil sheet and the faying surface of the adjacent member.

With the plating materials Ag-Cu-Ni mentioned, an initial temperature of the order of 1780°F has been found satisfactory. After at least a portion of the plating material has been rendered liquidus to thereby establish an atomic bridge between each side of the foil and its adjacent member, the heating is continued at a temperature to promote required atomic diffusion across the bridge thus established. Since the time and temperatures required for such L.I.D. bonding are well known by those familiar with the art, and may vary with the eutectic effect of various plating materials employed, such parameters will be determined by conventional calculations and test procedures for each structure, part material, and plating material or materials employed. However, temperatures within the range 1450° – 1800° F, and usually about 1780° F, have been found satisfactory for the foil L.I.D. bonding of the component parts of a titanium honeycomb core sandwich of the type shown in FIG. 1.

In bonding a honeycomb core panel in accordance with the invention as shown in FIG. 1, only the edges of the cell walls of the honeycomb core contact the inner face of the foil, the foil areas within the cells being free of core support. Cut-away inspection of such sandwich panel after bonding discloses that a portion of the exposed foil within these open cell areas, by surface tension, forms fillets at the L.I.D. joints between each facing sheet and the cell walls of the honeycomb core, a portion of the remainder of the foil and its plating in these areas is diffused into the surface of the facing sheet, and any remainder is in the form of a gray, foamy trace on the inner side of the facing sheet.

Figure 2:
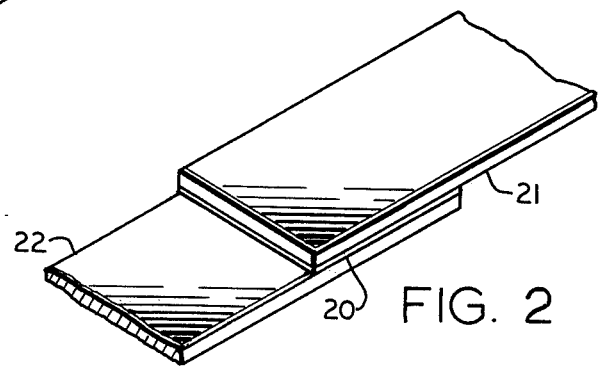
FIG. 2 is a perspective view of two thick section titanium members with a layer of the plated titanium foil interposed therebetween.

In the L.I.D. bonding of thick section parts as shown in FIG. 2, the same general procedure is followed as that described previously herein for the brazing of the honeycomb sandwich panel of FIG. 1. A sheet 20 of plated titanium foil, prepared as described previously herein for the foil layers 13 and 14, is interposed between the faying surfaces of parts 21 and 22 of titanium or selected titanium alloy or alloys to be bonded together. However, in the bonding of such members or parts the plated foil preferably is shaped to fit the faying surfaces of the parts or members which are to be bonded together. This avoids the possibility of contamination by the plating or foil materials of any area of either of the members beyond the area or areas of bonding.

Figures 3, 4:
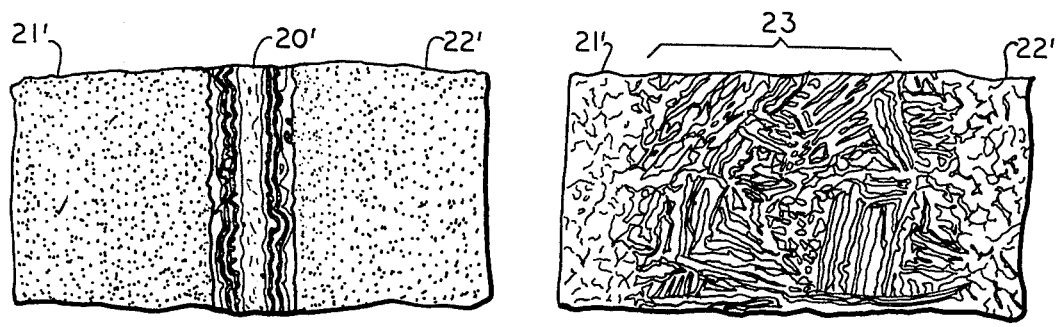
FIG. 3 is a drawing of a greatly enlarged microphotograph showing a cut sectional through a sheet of the plated foil interposed between the faying surfaces of two titanium members to be joined by liquid interface diffusion.
FIG. 4 is a microphotograph similar to FIG. 2 after the L.I.D. bonding of the parts has been completed.

The drawing of a microphotograph, in FIG. 3 shows a layer of the plated foil, designated 20', interposed between fragments of titanium members 21' and 22' to be bonded. FIG. 4 shows the diffusion zone 23, as described herein in which the diffusion bonding occurs, and throughout which foil plating materials are dispersed in minute quantities upon completion of the foil L.I.D. bonding.

The present invention greatly enhances in many instances the production potential and simplicity of L.I.D. bonding, since the plated foil can be prepared in advance of use in the form of sheets and rolls, can be cut or formed by dies or otherwise as desired to fit specific applications, and can be stored, transferred, and handled as required. The fact that two plated surfaces are available, one on each side of the foil, allows for the provision of additional plating material for the bond if desired. Additionally, the use of the foil allows close process control, since test samples can be cut from the foil and tested, a procedure impossible when the plating is imposed directly on a faying surface of a member or part to be L.I.D. bonded.

Having thus described my invention, what I claim as new and useful and desire to secure by U.S. Letters Patent is:

1. A plated foil for foil liquid interface bonding of members of titanium or selected titanium alloys comprising
   a sheet of foil of titanium or a selected titanium alloy etched and chemically cleaned and having a thickness on the order less than 0.001 each, and
   braze type metal plated onto each side of the etched foil, said braze type metal on each side of said foil consisting of successive plating layers of Cu-Ag-Ni plated thereon in the order named, whereby when the plated foil is interposed between relatively interfitting faying surfaces of such members and heated to a temperature to render liquidus plating metal of the foil the plating metal provides a liquid bridge for the liquid interface bonding of the members.

2. A liquid interface diffusion bonded structure comprising two titanium base members diffusion bonded and joined together with a titanium base layer having, on each side thereof successive plating layers of Cu-Ag-Ni plated thereon in the order named, therebetween, the region of the bonded joint between each said member and said layer comprising grain growth on the titanium across the joint and diffusion and dilution within and throughout said region of traces of liquid interface diffusion bridge materials comprising copper, silver and nickel, said bridge materials adding of the order of 6 grams per square foot per interface of the bonded structure.

* * * * *